March 9, 1926.
S. BOYER
1,576,083
METHOD OF REFINING GALLIUM METAL
Filed August 12, 1925
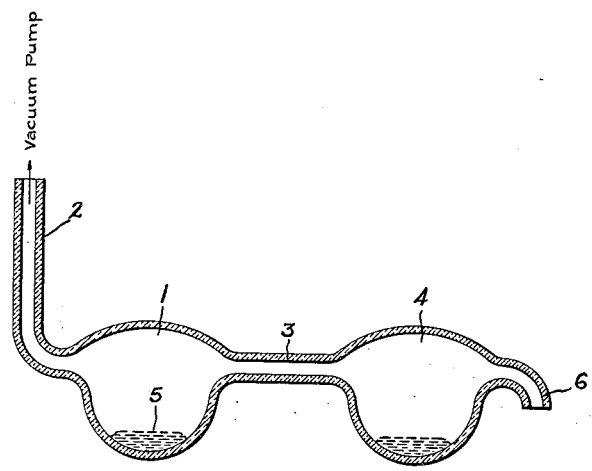
Inventor:
Sylvester Boyer;
by
His Attorney.

Patented Mar. 9, 1926.

1,576,083

UNITED STATES PATENT OFFICE.

SYLVESTER BOYER, OF LYNN, MASSACHUSETTS, ASSIGNOR TO GENERAL ELECTRIC COMPANY, A CORPORATION OF NEW YORK.

METHOD OF REFINING GALLIUM METAL.

Application filed August 12, 1925. Serial No. 49,841.

*To all whom it may concern:*

Be it known that I, SYLVESTER BOYER, a citizen of the United States, residing at Lynn, in the county of Essex, State of Massachusetts, have invented certain new and useful Improvements in Methods of Refining Gallium Metal, of which the following is a specification.

This application is a continuation in part of Serial No. 5,362, filed January 28, 1925.

The present invention relates to the metal gallium, and the object thereof is to remove oxide and other impurities from this metal or its alloys. Gallium is a silvery metal which is liquid at room temperature and which is related to aluminum in its chemical properties.

As heretofore prepared, gallium has been associated with non-metallic constituents, such as occluded hydrogen and a surface coating of oxide. An oxide film on the metal affects the surface tension of the metal and causes the metal to adhere to vitreous surfaces, such as glass or quartz. In my copending application above mentioned, I have set forth the suitability of gallium as an indicator metal for high temperature thermometers. When the metal is to be use in thermometers, the removal of impurities such as oxides is especially important.

The present invention comprises the process whereby gallium is freed from impurities in order to render it suitable for thermometry and other uses.

My invention is based on a discovery that the surface of the metallic gallium may be protected from oxidation by a coating of a halogen compound of gallium, preferably gallium chloride and that this halogen compound may be removed by volatilization and that when volatilization process is carried out in a vacuum, occluded gases, such as hydrogen or argon, may be removed with the halogen compound, leaving the gallium in a clean, bright condition, free from oxides and non-metallic impurities. In this condition the metal exhibits new properties and in particular does not adhere to a vitreous surface.

In the accompanying drawing I have shown an apparatus wherein the process may be conveniently carried out.

In the preparation of pure metallic gallium the metal first may be freed from other metals alloyed therewith by an electrolytic process described by Theodore W. Richards and myself in the J. Am. Chem. Soc. Vol. 41, page 133, 1919 and Vol. 43, page 274, 1921. The metal obtained as the result of this process is provided with a film of halogen compound either by treating the metal with suitable halogen acid or by treating it with a gaseous halogen such as chlorine.

In accordance with a preferred method of carrying out my invention the gallium, which has been produced by electrolysis and which upon contact with the air immediately forms on its surface a film of oxide, is treated with hydrochloric acid, preferably warm acid, thereby converting whatever oxide may have been formed on the surface of the gallium to a chloride and forming by reaction between the metal itself and the acid an additional amount of gallium chloride, conveniently a mixture of equal volumes of concentrated hydrochloric acid and water may be used for this purpose. The metallic gallium may be fused while submerged in the hydrochloric acid and then resolidified. The excess of acid is removed and the metal is placed in a quartz container 1 which is connected by a conduit 2 with a vacuum pump and by a conduit 3 to a receptacle 4. After exhausting gases, the gallium charge 5 is first heated to a temperature of about 500° C. to volatilize the skin of gallium chloride which is deposited in the upper part of the bulb 1. Some of the occluded gas also is driven off at this temperature. The metallic gallium is left in the bulb 1 in a clean, bright condition free from chloride or oxide. The gallium then is heated to about 1000° C. to drive off hydrogen and other gases, the operation of the vacuum pump being continued. Preferably the metal is cooled and reheated a number of times and finally is transferred to the receptacle 4 which may be sealed off from the container 1 at 3. The metal may be removed by distillation or otherwise through a conduit 6.

Instead of producing the coating of chloride or other halogen compound on the surface of the gallium by an acid, the gallium to be purified may be heated in a container in contact with a dry halogen gas, the air preferably first being withdrawn from the container. The halogen thus formed on the gallium may be volatilized as above described.

Although my invention is particularly applicable to the production of pure gallium for use in thermometers and other scientific devices it can also be employed for the purification of alloys of gallium or for the purification of closely related metals such as indium. I mean by the appended claims to cover also the purification of alloys of gallium and the purification of metals having similar chemical properties.

In another copending application, Serial No. 70,191, claims are made on a thermometer containing gallium or an alloy of gallium as the indicating metal.

What I claim as new and desire to secure by Letters Patent of the United States is:

1. The method of purifying gallium which consists in forming a film of a halogen compound on the surface of a charge of metallic gallium to be purified and heating said charge in a vacuous space to a temperature at which the halogen film is volatilized.

2. The method of purifying gallium produced by electrolysis which consists in forming a film of a halogen compound on the surface of said metal, heating said metal in a vacuum to a temperature at which said compound is volatilized and then heating to a higher temperature to remove occluded gases.

3. The method of refining gallium which consists in treating the impure gallium with a halogen acid of sufficient concentration to form a film of a halogen compound on the surface of said metal, and then removing said film by volatilization in a vacuum.

4. The method of refining gallium which consists in fusing the impure gallium in contact with hydrochloric acid of sufficient concentration to form a film of chloride of gallium on said metal, removing said metal to a vacuous space and heating to a temperature of about 1000° C.

In witness whereof I have hereunto set my hand this 10th day of August 1925.

SYLVESTER BOYER.